March 25, 1969  R. E. SHELHART  3,434,282
SAFETY BACKUP SYSTEM FOR POWER STEERING
Filed March 14, 1967  Sheet 1 of 3
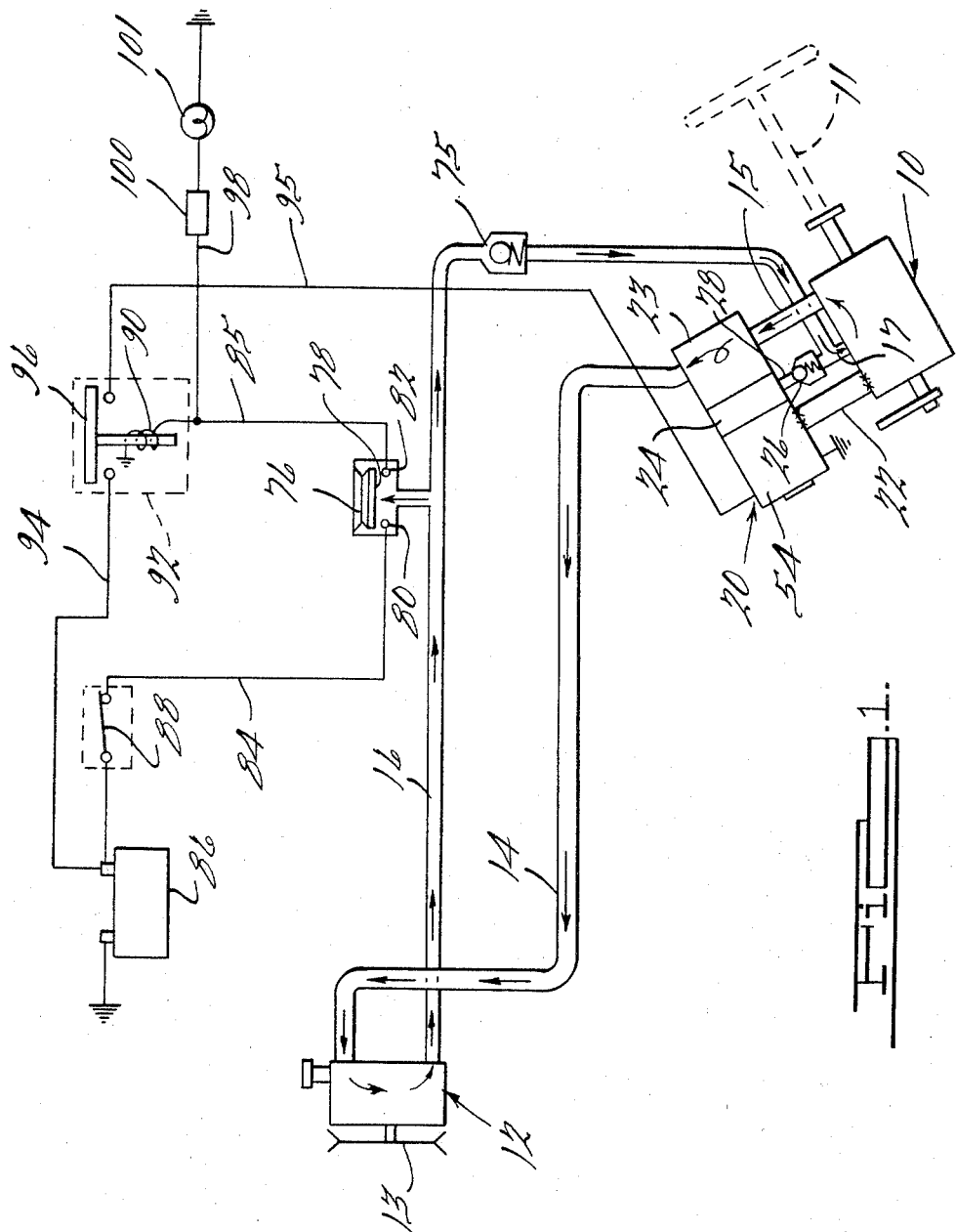
INVENTOR.
Robert E. Shelhart
BY
Harness, Dickey & Pierce
ATTORNEYS.

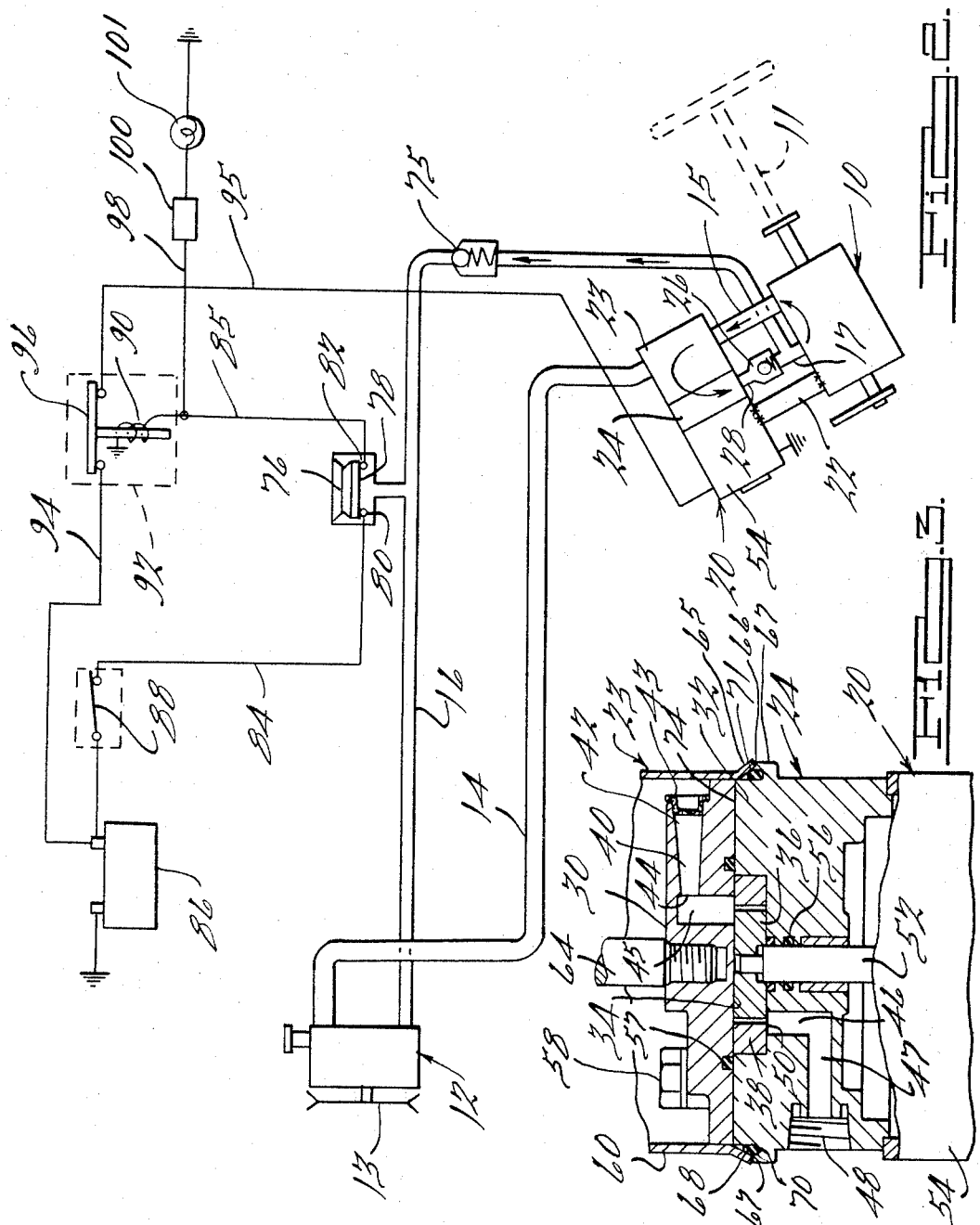

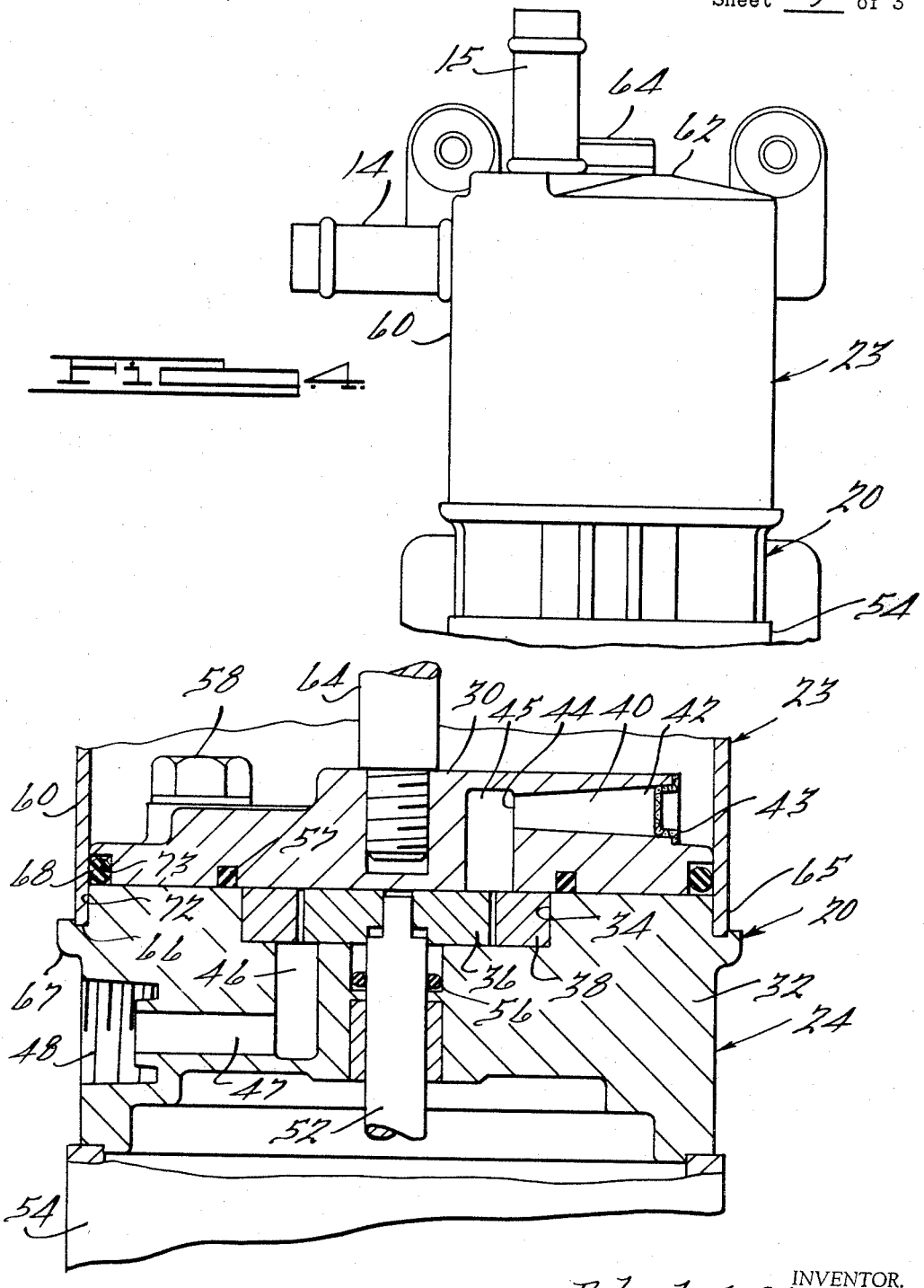

United States Patent Office 3,434,282
Patented Mar. 25, 1969

3,434,282
SAFETY BACKUP SYSTEM FOR POWER STEERING
Robert Edward Shelhart, Dearborn, Mich., assignor to Dura Corporation, Oak Park, Mich., a corporation of New York
Filed Mar. 14, 1967, Ser. No. 623,066
Int. Cl. F15b *15/18;* F04b *21/00;* B62d *5/06*
U.S. Cl. 60—52                                                    14 Claims

ABSTRACT OF THE DISCLOSURE

There is herein disclosed a power steering arrangement in which a main conventional hydraulic power steering system is provided with an hydraulic safety backup system comprising an electrically operated motor-pump-reservoir unit operable by a pressure responsive device upon reduction in pressure in the main system.

Summary

In general, the inventive concepts have been incorporated in power operated hydraulic steering apparatus of conventional design comprising an hydraulically operable steering gear and an engine driven power steering pump with a reservoir connected to the steering gear by hydraulic pressure lines. Systems of this type are dependent upon operation of the vehicle engine for power to operate the power steering system. Whenever the motor is off, the power steering is off and the vehicle must be manually steered. If the vehicle is moving when the engine shuts off, the resultant change from power steering operation to manual steering operation is abrupt and startling. If the vehicle is on a curve, such as on a parking ramp, the transition from power steering to manual steering may require very fast reaction on the part of the vehicle operator to maintain the desired course of travel. Oftentimes, rather great strength is required to manipulate the steering gear during manual operation and some operators, such as women, have difficulty in controlling the vehicle.

The problem of sudden change from power steering to manual steering is more acute with certain types of steering gear such as those types utilizing lever, handle, or small wheel operator controls. With steering gear having operator controls providing little or no mechanical advantage, manual steering may be virtually impossible.

In addition to stopping of the vehicle engine, the power steering may also be disrupted by hydraulic failure due to broken hydraulic lines or fittings or leaks in the system. Furthermore, it is common practice to drive the power steering pump from the engine fan shaft by belt and pulley arrangements which are also a possible source of failure of the system. The common location of the power steering pump at the front of the engine also subjects the power steering system to the possibility of failure in a front end crash which might prevent the operator from taking subsequent evasive action.

Although a back-up system might be designed to be completely independent of the main system, this invention contemplates incorporating the back-up system in the main system to reduce cost and save space while, for the most part, eliminating and isolating the various sources of failure of the main system from the back-up system. A back-up system of this general type has been previously proposed as disclosed in U.S. Patent No. 3,280,557.

The primary purpose of this invention is to provide a new and improved electro-hydraulic safety back-up system for an engine-operated main hydraulic power steering system, which will provide power steering during any of the aforediscussed failures immediately upon reduction of hydraulic pressure in the main system for any reason, which will isolate most of the main hydraulic system from the back-up hydraulic system to maximize the possibility of eliminating any portion of the main hydraulic system where failure may occur, which will be located closely adjacent the steering gear away from the front of the engine compartment to minimize the length of hydraulic lines and to minimize the chance of damage in front end collisions, which will provide an indication of the failure of the main system, which will have a reduced number of hydraulic lines, and which utilizes a low cost highly dependable auxiliary electrically operable pump capable of successfully operating under the extreme pressures encountered in power steering systems.

Description of drawings

The invention is hereinafter described in detail by reference to the accompanying drawings, in which:

FIGURE 1 is a schematic view of a power steering system incorporating the inventive principles and showing normal operation of the main power steering system;

FIG. 2 is another schematic view of the power steering system of FIG. 1 showing operation of the safety back-up system;

FIG. 3 is a side elevational view, with parts broken away, of a portion of a back-up motor-pump-reservoir unit utilized in the present invention;

FIG. 4 is a partial side elevational view of a presently preferred form of back-up motor-pump-reservoir unit; and FIG. 5 is a partial cross-sectional view of the apparatus shown in FIG. 4.

Detailed description

Referring now to FIGS. 1 and 2, the main power steering system is shown to comprise a conventional hydraulic operated power steering gear 10 having a steering wheel 11, a conventional power steering pump and hydraulic reservoir 12 having an engine driven pulley 13, and hydraulic fluid lines 14, 15, 16, 17 by which hydraulic fluid is delivered to and returned from the steering gear.

The safety back-up system comprises an electrically operable motor-pump-reservoir unit 20 which is preferably mounted closely adjacent the steering gear 10 by suitable bracket means 22. While the unit 20 is illustratively shown to be mounted in closely spaced relationship to the steering gear to minimize the length of the hydraulic lines therebetween, it is contemplated that the unit 20 may be advantageously mounted directly on and/or incorporated with the steering gear apparatus. The unit 20 is similar to convertible top actuating apparatus of the type shown in U.S. 2,725,074 but includes novel features related to its present use in an hydraulic power steering system.

A power steering hydraulic system is subjected to relatively high pressure conditions which may vary from, for example, 60 p.s.i. during normal driving conditions to as much as 900 to 1000 p.s.i. during parking maneuvers. Furthermore, during cold temperature conditions, extremely high pressures are also encountered. One of the problems with certain prior art apparatus has been its inability to successfully withstand high pressure operation.

A reservoir section 23 of the back-up unit 20 is connected to return lines 14, 15 of the main power steering system so that the hydraulic fluid of the main system continuously replenishes and maintains the back-up system reservoir in a full condition. The reservoir 23 is preferably mounted at a lower level than the main power steering pump-reservoir unit 12 so that in the event of failure of the main system the hydraulic fluid can flow by gravity to the backup system. A pump section 24 of the back-up unit 20 is located in juxtaposition adjacent the reservoir section 23 and is connected to the supply lines 16, 17 of the main power steering system through a spring biased ball-type check valve 26 in a backup supply line 28. As shown in FIGS. 3 and 5, the pump section 24 is formed by a pump housing comprising a cover plate portion 30 mounted on a main pump housing portion 32 and defining a pump cavity 34 therewith. Pump means in the form of an inner rotor 36 and an outer rotor 38 are mounted in operative pumping relationship in the pump cavity for withdrawing hydraulic fluid from the reservoir 23 through a supply passage 40. One end 42 of the passage 44 opens at the bottom of the reservoir through a filter screen 43. The other end 44 opens in an enlarged fluid inlet cavity 45 having a kidney shape (not shown) in plan elevation. The cavity 45 overlies the adjacent sides of the rotors 36, 38 which have a configuration such as to provide moving fluid pockets whereby fluid is pumped from the inlet cavity to an outlet cavity 46 and discharge passage 47 when rotor 36 is rotated. Suitable outlet line connection means 48 are provided at the end of passage 47. One of the features of this invention is the location of the inlet cavity 45 and outlet cavity 46 in diagonally opposite relationship on opposite sides of the rotor elements which enables the number of hydraulic lines to be reduced and the operation of the pump to be improved. Cavity 45 is approximately 17% larger than cavity 46 in the illustrative embodiments.

Another feature of this invention is the provision of radially extending inlet and outlet passages 40, 47 with the inlet opening 42 of the inlet passage 40 being located at the very bottom of and adjacent to the outer periphery of the reservoir. By this arrangement, the unit may be mounted to enable operation with a minimum amount of fluid in the reservoir.

Inner rotor 36 is rotated relative to the outer rotor 38 by a drive shaft 52 connected to a motor section 54 of the back-up unit 20. Pump chamber 34 is sealed by motor shaft O-ring seal means 56 and by an O-ring seal 57 between the main housing and the cover plate which are removably secured to one another along abutting surfaces forming a transversely extending joint by suitable fastening means 58.

The reservoir 23 is formed by a generally cup-shaped casing in the form of a cover having a cylindrical peripheral wall portion 60 and a cover portion 62, FIG. 4, which intersect one another at one end of the unit. The reservoir casing is removably secured to the pump housing by suitable fastening means 64. The end flange portion 65 extends beyond the cover plate 30 and the supporting surface of the pump housing 24 and is adapted to be seated on a locating seat 66 on a flange 67 extending around the pump housing. One of the problems with an auxiliary pumping unit of the type herein described is the construction and sealing of the auxiliary reservoir to prevent failure and leakage under extremely high pressures to which power steering systems are subjected.

In the prior art, in low pressure applications, a reservoir sealing means 68, in the form of a resilient O-ring, has been mounted as shown in FIG. 3 to prevent leakage past the relatively thin, i.e. about 0.0417 inch thick sheet metal, and distendable reservoir cover. In one prior art embodiment, shown in FIG. 3, the seal seat 70 is formed on flange 67 and extends about the pump housing. The bottom 65 of the side wall of the cover is turned outwardly and pressed onto the seal at 71 in an inwardly directed manner. Any fluid leaking radially outwardly between the housing and cover will come into contact with the reservoir side of the seal 68 and cause high pressure forces on the seal to be directed toward the seal seat 70 to cause the seal to be expanded into tight sealing engagement along the seam between the cover wall 60 and the flange 67.

In a presently preferred embodiment for high pressure operation, shown in FIGS. 4 and 5, the bottom end portion 65 of the side wall of the cover extends parallel to, beyond, and over an adjacent guide surface 72 on the side of the pump housing. Surface 72 has a closely fitting cylindrical peripheral configuration corresponding to the cylindrical peripheral configuration of the end portion of the cover. The flange portion 67 and cover seat 66 are located a substantial distance longitudinally away from the reservoir 23 toward the pump housing 24 beyond a peripheral sealing cavity 73 formed in the pump portion and opening toward the adjacent side wall of the reservoir casing. The cavity 73 is located between the reservoir and the guide surface 72 at the joint 74 between the cover plate 30 and the housing 32 which extends to the periphery of the pump housing. Thus, sealing cavity 73 is defined in part by the cover plate and the pump housing. Guide surface 72 slidably supports the casing 60 for longitudinal movement relative to the pump housing so as to permit substantial longitudinal movement of the casing, i.e. about 1/16 to 3/16 inch in the illustrative embodiment, away from the pump housing toward the reservoir under high pressure conditions, while secured on the pump housing by fastening means 64, without affecting the sealing relationship between the sealing means 68 and the casing 60 and the pump housing 32. The resilient compressible O-ring seal 68 is slightly oversize relative to the internal dimension of the adjacent surface of the casing 60 and is compressibly seated thereon. High pressure in the reservoir will tend to flatten the O-ring against the top of the pump housing and expand the O-ring radially outwardly into sealing engagement with the casing.

In order to further provide for high pressure conditions in the system, return lines 14, 15 are connected to one another through the reservoir 23 by an arrangement providing a minimal flow path through the reservoir. As shown in FIG. 4, return line 15 is connected to the reservoir through the cover portion 62 closely adjacent the side wall portion 60 and return line 14. In this manner, the return line for the main system includes an inlet opening in one intersecting wall of the reservoir cover and an outlet opening in another intersecting wall of the reservoir cover located closely adjacent the intersection between the walls and one another whereby a minimal fluid flow path is provided through the auxiliary reservoir between the inlet opening and the outlet opening.

Referring again to FIGS. 1 and 2, the backup system includes an additional spring biased ball-type check valve 75 mounted in the supply passage 16 of the main power steering system between the power steering gear 10 and the main power steering pump 12. A pressure operable switch 76 is connected to the main supply line 16 between the ball check valve 75 and the main power steering pump 12. The pressure operable switch has contact means 78 arranged to be maintained in an open condition relative to contact means 80, 82 in circuit lines 84, 85 as long as a predetermined minimum steering gear operating hydraulic pressure is maintained in the supply passage 16. Circuit line 84 is connected to an energy source such as a vehicle battery 86 through the ignition switch 88. Circuit line 85 is connected to the coil 90 of a back-up pump motor controlling relay 92. A motor circuit is connected by a line 94 to the battery and by a line 95 to the pump motor 54 through contact means 96 operable to a closed condition by energization of the coil. A warning circuit 98 may be connected in parallel with the relay 92 to energize a flasher 100 and instrument panel light 101 whenever the pressure switch 76 is closed due to reduction in pressure in the main power steering system supply line 16.

In operation of the main power steering system, as shown in FIG. 1, the pump 12 is normally driven by the vehicle engine through the pulley drive means 13. Hydraulic fluid is forced along supply line 16 into the pressure cavity of switch 76 and past the ball check valve 75 to the power steering gear 10. The pressure of the fluid maintains the switch contacts 78, 80, 82 open and forces the ball check valve 75 to the open position permitting passage of hydraulic fluid to the steering gear. Ball check valve 26 is arranged to be closed by pressure in the main system supply passage 16. The fluid is returned from the power steering gear through return lines 14, 15 through the backup system reservoir portion 23 of the unit 20. In this manner, in normal operation the hydraulic fluid is circulated in a closed path between the main pump 12 and the power steering gear 10.

The safety backup system is arranged to be effective immediately upon disruption of the normal operation of the power steering gear due to lack of fluid pressure in supply line 16 which condition is immediately sensed by the pressure switch 76 located downstream of the main pump 12. The pressure switch closes upon reduction in fluid pressure and completes a circuit through contacts 78, 80, 82 to relay coil 90 as well as the flasher 100 and instrument panel light 101. Relay 92 is immediately activated to complete a circuit to the backup pump motor 54 through contact 96 which immediately causes the backup pump to become effective to supply operating fluid under pressure to the power steering gear. At the same time, the flasher and instrument panel light give immediate notice to the vehicle operator of main system failure. When the pressure in the supply line 16 drops, ball check valve 75 is subsequently closed to isolate the main power steering system from the backup system. It may be noted that the fluid under pressure from the backup pump 24 in the backup supply line 28 enters the main supply line 17 downstream of the ball check valve 75 and is effective to maintain the valve in the closed position during use of the backup system.

Fluid is delivered by pump 24 from the backup reservoir 23 to the power steering gear 10 through ball valve 26 in supply line 28 and returns by the main power steering return line 15. Any fluid in the main power steering supply line 14 will flow downwardly toward the backup reservoir 23 if additional fluid is needed. However, normally, the backup reservoir 23 is always maintained full and ready for instantaneous delivery of hydraulic fluid in a short closed circulating path through the power steering gear. The backup system will be effectively isolated from the main system due to the pressure differential obtaining in the backup reservoir 23 as the backup pump 24 withdraws fluid therefrom.

At the starting of the engine, before pressure builds in the main system, the operability of the backup system will be indicated by a momentary energizing of the flasher and panel light circuit 98 when the ignition switch 88 closes with pressure switch contacts 78, 80, 82 closed. Also the backup pump motor will be momentarily energized to clear the backup system.

It is contemplated that the length of the pressure lines between the backup unit 20 and the power steering gear 10 may be substantially shortened to reduce the risk of failure in the backup system by mounting the backup unit as close as possible to the power steering gear. The shortest length would be found in a backup unit which was incorporated in or directly associated with the power steering gear.

The aforedescribed illustrative embodiment of the invention is intended to show by way of example one particular apparatus for accomplishing the desired results. To the extent that the invention is capable of being otherwise embodied, it is intended that the appended claims be construed to cover alternative embodiments of the invention except insofar as limited by the prior art. The inventive features claimed are:

1. A vehicle power steering electro-hydraulic safety backup system for use with a main power steering hydraulic system having a main power steering hydraulic pump and reservoir, the pump being operable by a power source to deliver high pressure hydraulic fluid to a fluid operable power steering gear through a supply line and to return hydraulic fluid through a return line from the power steering gear to the main power steering pump and reservoir comprising:

an auxiliary fluid reservoir connected to the return to said power steering gear in the event of failure in said main power steering system, an auxiliary fluid reservoir connected to the return line between said power steering gear and said main power steering hydraulic pump and reservoir and there being only one return line so that all fluid being returned from said power steering gear by either said power steering hydraulic pump or said auxiliary pump passes through said auxiliary fluid reservoir before reaching said main power steering hydraulic pump and reservoir, an auxiliary supply line connecting said auxiliary pump to said power steering gear, and said auxiliary pump being connected to said auxiliary reservoir and operable to deliver fluid under pressure therefrom to said power steering gear through said auxiliary supply line and to return fluid from the power steering gear through the return line to the auxiliary reservoir.

2. The invention as defined in claim 1 and wherein said auxiliary pump and auxiliary reservoir are mounted at an elevation below said main pump and reservoir.

3. The invention as defined in claim 1 and said auxiliary reservoir being defined at least in part by a pair of adjacent intersecting side walls, said return line including an inlet opening and an outlet opening in said auxiliary reservoir, said inlet opening being located in one of said side walls and said outlet opening being located in the other of said side walls closely adjacent the intersection thereof whereby a minimal fluid path is provided through said auxiliary reservoir between said inlet opening and said outlet opening.

4. A motor-pump-reservoir unit adapted to be used in a high pressure system such as a power steering system or the like and comprising in juxtaposition along the longitudinal axis of an elongated generally tube-like unit:

a fluid reservoir formed at one end of said unit, a pump housing located next adjacent said reservoir intermediate the ends of said unit, a pump plate mounted on said pump housing between said pump housing and said reservoir, a pump cavity formed between said pump housing and said pump plate, rotatable pump means mounted in said pump cavity, pump operating means mounted next adjacent said pump housing opposite said reservoir and said pump plate, rotatable drive shaft means extending through said pump housing into said pump cavity and being operatively associated with said rotatable pump means, a fluid inlet passage in said pump plate connected to said reservoir, a fluid inlet cavity in said pump plate connected to said inlet passage and overlying a portion of said pump cavity, a fluid outlet cavity in said pump housing located diagonally opposite said inlet cavity and overlying a portion of said pump cavity, and a fluid outlet passage connecting said fluid outlet cavity to said auxiliary supply line.

5. The invention as defined in claim 4 and wherein said fluid inlet cavity is enlarged relative to said fluid outlet cavity, said inlet passage extends transversely relative to the longitudinal axis inwardly from a position adjacent the periphery of the unit to said inlet cavity and said outlet passage extends transversely to the longitudinal axis outwardly from said outlet cavity to a position adjacent the periphery of the unit.

6. A pump-reservoir unit adapted to be used in a high pressure system such as a power steering system or the like and comprising in juxtaposition in an elongated generally tube-like unit:

a fluid reservoir formed at one end of said unit, a pump housing located next adjacent said reservoir, a removable relatively thin wall reservoir casing removably attached to said pump housing and forming a peripheral wall enclosing said reservoir, resilient sealing means provided between said casing and said pump housing and mounted such that a first surface area is exposed to high pressure fluid from said reservoir, a second opposite surface is abutted on said pump housing, a third side surface is abutted on said casing for resilient compressible sealing engagement therewith by outward expansion under the influence of the high pressure fluid in said reservoir, and a portion of said casing being slidably supported on a portion of said pump housing and extending longitudinally beyond said sealing means a distance permitting movement under high pressure conditions away from said sealing means without disrupting the sealing relationship therebetween.

7. The invention as defined in claim 6 and said pump housing and said casing abutting along a peripheral seam and said sealing means being mounted circumjacent said seam.

8. The invention as defined in claim 7 and said pump housing having a peripherally extending seal seat mounting said sealing means adjacent said seam.

9. The invention as defined in claim 8 and said casing terminating in a flange portion abuttingly engaging said sealing means adjacent said seal seat.

10. The invention as defined in claim 9 and said flange portion extending a substantial distance longitudinally away from said reservoir toward said pump housing beyond said seal seat and said sealing means so as to permit substantial longitudinal movement of said casing away from said pump housing toward said reservoir under high pressure conditions encountered in the system without affecting the sealing relationship between said sealing means and said casing and said pump housing.

11. The invention as defined in claim 10 and having a peripheral seat on said pump housing facing said reservoir and adapted to seat the end of said casing and longitudinally position said casing relative to said pump housing.

12. The invention as defined in claim 11 and having a guide surface on said pump housing extending longitudinally a substantial distance from said seat toward said reservoir and said sealing means and slidably supporting said casing for longitudinal movement relative to said pump housing.

13. The invention as defined in claim 12 and having a peripheral sealing cavity formed in said pump housing and opening toward the adjacent side wall of said casing and being located between said reservoir and said guide surface, said sealing means being mounted in said sealing cavity and extending outwardly thereof into sealing engagement with said casing.

14. The invention as defined in claim 13 and said pump housing comprising a main housing portion and a covering plate portion removably mounted thereon between said main housing portion and said reservoir, abutting surfaces of said main housing portion and said covering plate portion forming a joint extending to the periphery thereof and terminating adjacent said casing, and said sealing cavity being formed at said joint and defined in part by said main pump housing and in part by said covering plate portion.

References Cited

UNITED STATES PATENTS 2,954,671  10/1960  Kress.

EDGAR W. GEOGHEGAN, *Primary Examiner.*

U.S. Cl. X.R.

91—1; 103—207; 180—79.2